United States Patent [19]

Hogan et al.

[11] Patent Number: 5,789,004
[45] Date of Patent: Aug. 4, 1998

[54] COPROCESSED MICROCRYSTALLINE CELLULOSE STABILIZER COMPOSITIONS, FOODS CONTAINING THE SAME AND STABILIZATION METHOD

[75] Inventors: Daniel T. Hogan, Yardley, Pa.; Dale T. Bertrand, East Windsor; Marlene T. Tuazon, Iselin, both of N.J.; Domingo C. Tuason, Bensalem, Pa.

[73] Assignee: FMC Corporation, Philadelphia, Pa.

[21] Appl. No.: 573,014

[22] Filed: Dec. 15, 1995

[51] Int. Cl.⁶ .................. A23L 1/0532; A23L 1/0534
[52] U.S. Cl. .................. 426/96; 426/567; 426/570; 426/573; 426/658; 426/804
[58] Field of Search .................. 426/565, 566, 426/567, 573, 804, 613, 583, 570, 658, 96

[56] References Cited

U.S. PATENT DOCUMENTS

| | | | |
|---|---|---|---|
| H1229 | 9/1993 | McGinley et al. | 426/654 |
| 3,067,037 | 12/1962 | Herald et al. | 99/139 |
| 3,539,365 | 11/1970 | Durand et al. | 106/197 |
| 3,827,899 | 8/1974 | Zirlin | 426/599 |
| 4,263,334 | 4/1981 | McGinley | 426/573 |
| 4,400,405 | 8/1983 | Morley et al. | 426/567 |
| 4,400,406 | 8/1983 | Morley et al. | 426/565 |
| 4,421,778 | 12/1983 | Kahn et al. | 426/564 |
| 5,192,569 | 3/1993 | McGinley et al. | 426/96 |
| 5,338,562 | 8/1994 | Humphreys | 426/603 |
| 5,366,742 | 11/1994 | Tuason et al. | 426/96 |

*Primary Examiner*—Cynthia L. Nessler
*Attorney, Agent, or Firm*—Christopher Egolf; Polly E. Ramstad; I. Robert Silverman

[57] ABSTRACT

A stabilizer composition, useful for reduced fat frozen desserts and whipped toppings, containing, as a first component, microcrystalline cellulose coprocessed with guar and, as a second component, microcrystalline cellulose coprocessed with carboxymethylcellulose. The method of using the stabilizer composition provides reduced fat food products, particularly products with less than ten percent fat, with many of the desirable body and textural characteristics of full-fat products.

40 Claims, No Drawings

COPROCESSED MICROCRYSTALLINE CELLULOSE STABILIZER COMPOSITIONS, FOODS CONTAINING THE SAME AND STABILIZATION METHOD

BACKGROUND OF THE INVENTION

1. Field of the Invention

The invention relates to foods, particularly reduced fat frozen desserts, containing, as a stabilizer composition, microcrystalline cellulose components coprocessed with hydrocolloids. The invention also extends to the stabilizer composition and the method of formulating foods such as frozen desserts with the stabilizer.

2. Background Information

In the food industry, the term "frozen desserts" is a market category that encompasses a wide variety of popular and specialty products whose common denominator is that they are served at temperatures below the freezing point of water. Frozen desserts include dairy-based food desserts such as ice cream, ice milk, sherbet, frozen yogurt, soft serve ice cream, nondairy frozen desserts like mellorine, and specialty items such as frozen novelties, e.g., bars, cones and sandwiches. Frozen desserts also include reduced fat (sometimes called lowered fat, low-fat, or light) and no fat (sometimes called fat free) versions of many of these traditional frozen desserts. Such reduced fat (including no fat) frozen desserts have become an important market segment of frozen desserts in recent years.

A particularly demanding challenge for the frozen dessert manufacturer or formulator is the duplication of all the desirable body and textural properties of full-fat frozen desserts in reduced fat versions of them.

The fat-containing component in traditional full-fat frozen dessert formulations serves many important functional roles. Fat functions as a flavoring agent and flavor carrier; as a foam stabilizer; as a texture modifier; and as an inhibitor to the formation of large ice crystals.

Reduced fat (including no fat) frozen dessert formulations require additives to compensate for the reduction or elimination of the fat component. Additives that are usually described as "stabilizers" are conventionally employed in reduced fat frozen dessert formulations to replace at least some of the functionality normally provided by the fat component. These frozen dessert stabilizers are typically blends of hydrocolloid gums, usually selected from xanthan, guar, locust bean, carboxymethylcellulose, carrageenan and alginate. Colloidal microcrystalline cellulose is also used in frozen dessert stabilizer compositions.

U.S. Pat. No. 3,539,365 issued to Durand et al. describes a colloidal microcrystalline cellulose composition (MCC) that is MCC coprocessed with carboxymethylcellulose. U.S. Pat. No. 3,067,037 issued to Herald et al. describes foamable food products such as toppings containing microcrystalline cellulose.

U.S. Pat. Nos. 4,400,405 and 4,400,406 both issued to Morley et al. describe whipped frozen desserts, including low fat versions, that utilize a stabilizer including a water binding agent (e.g., locust bean gum, guar gum, propylene glycol alginate, tara gum, cellulose ethers), a gelling agent (e.g., gelatin, xanthan gum, carrageenan, sodium alginate, pectin), and an insoluble blocking agent (e.g., microcrystalline cellulose, cellulose fibers) (see cols. 7–8).

U.S. Pat. No. 4,421,778 issued to Kahn et al. describes freezer stable whipped ice cream and milk shake products that contain as stabilizers microcrystalline cellulose and carboxymethylcellulose, optionally with a third stabilizer, calcium carrageenan or sodium alginate (col. 1, lines 35–53).

U.S. Pat. No. 5,366,742 issued to Tuason, Jr. et al. describes a dry microcrystalline cellulose composition that is MCC coprocessed with an alginate calcium/sodium salt complex. A frozen dessert containing 4 percent butterfat and this composition in a 80:20 MCC to alginate weight ratio is described at cols. 10–11 as providing functionality that was equivalent to colloidal microcrystalline cellulose, i.e., MCC coprocessed with sodium carboxymethylcellulose.

U.S. Pat. No. 5,192,569 issued to McGinley et al. describes a dry microcrystalline cellulose coprocessed with a galactomannan gums such as guar gum. Low fat and no fat frozen dessert formulations containing MCC coprocessed with guar are described in Examples 2 and 9. The exemplified formulations also contained carboxymethylcellulose as an additional component, which was not coprocessed with the MCC.

Although the prior art teaches reduced fat frozen dessert formulations containing either MCC coprocessed with CMC or MCC coprocessed with guar, there is no suggestion that these coprocessed MCC materials should be used in combination in frozen dessert formulations.

An object of the present invention is a stabilizer composition and method useful in reduced fat, including no fat, frozen desserts and in other reduced fat aerated food systems.

SUMMARY OF THE INVENTION

One aspect of the present invention is a stabilizer composition, useful for stabilizing food products, containing (a) microcrystalline cellulose (MCC) coprocessed with guar and (b) microcrystalline cellulose coprocessed with carboxymethylcellulose (CMC).

The stabilizer composition preferably contains the MCC coprocessed with guar in an amount of from about 30 to about 90 weight and the MCC coprocessed with CMC in an amount of from about 10 to about 70 weight percent (%), based on the weight of the stabilizer composition. The MCC coprocessed with guar is preferably present in the greater amount, of the two coprocessed MCC components in the stabilizer composition.

In the stabilizer composition, the MCC coprocessed with guar preferably contains a weight ratio of MCC to guar of from about 90:10 to about 80:20 and the MCC coprocessed with CMC preferably contains a weight ratio of MCC to CMC of from about 90:10 to about 80:20.

Preferred stabilizer compositions are those in at least one water soluble hydrocolloid is also present in the stabilizer composition, in addition to the coprocessed MCC components. Preferred hydrocolloids include xanthan gum, carrageenan, carboxymethylcellulose, guar gum, locust bean gum, sodium alginate and other hydrocolloid gums used in frozen dessert formulations.

Another aspect of this invention is a food product that is a frozen dessert, whipped topping or other aerated food product having less than about 10 weight percent fat and containing a stabilizer system of microcrystalline cellulose coprocessed with guar and microcrystalline cellulose coprocessed with carboxymethylcellulose. The stabilizer system is preferably present in the food product in an amount of from about 0.5 weight percent to about 5 weight percent, more preferably, from about 1 weight percent to about 2.5 weight percent, based on the weight of the food product.

Preferably, the food product contains less than about 5 weight percent fat or contains essentially no fat.

Preferred frozen dessert products are those utilizing the stabilizer composition of this invention in a reduced fat formulation. Suitable for use with the stabilizer composition of this invention are frozen dessert products such as ice cream, ice milk, soft serve ice cream, frozen yogurt, frozen milk shake, sherbet, gelato and mellorine.

Still another aspect of this invention is a method of stabilizing a reduced fat food product that is a frozen dessert or reduced fat whipped topping by incorporating into such a food product having less than about 10 weight percent fat a stabilizer system that contains (a) microcrystalline cellulose coprocessed with guar and (b) microcrystalline cellulose coprocessed with carboxymethylcellulose, the stabilizer system being incorporated into the food product in an amount of from about 0.5 to about 5 weight percent, based on the weight of the food product. The method is particularly effective for food products, particularly frozen desserts, that contain less than about 5 weight percent fat or that contain essentially no fat.

DETAILED DESCRIPTION OF THE PREFERRED EMBODIMENTS

The stabilizer composition of this invention provides desirable performance characteristics that mimic the functionality of the fat component in conventional full-fat frozen desserts, whipped toppings or other aerated foods. For this reason, the stabilizer composition is most useful in reduced fat foods, especially frozen desserts, in which the fat content has been decreased or even eliminated altogether. The term "reduced fat", as used in this disclosure, is intended to cover food products containing less than 10 weight percent fat, preferably containing less than 5 weight percent fat and includes product formulations that contain essentially no fat.

The first of the two coprocessed microcrystalline cellulose components of the stabilizer composition of this invention is microcrystalline cellulose (MCC) that has been coprocessed with guar gum. The coprocessed MCC is a particulate material that is at least partially coated or intimately admixed with the guar gum, and the resulting coprocessed MCC material is readily dispersible in an aqueous medium.

The term "coprocessed" as used in this specification refers to the physical processing of the named hydrocolloid with MCC in a manner that imparts improved physical characteristics to the coprocessed MCC, not exhibited by MCC alone or by simple blends or dry mixtures of MCC with the hydrocolloid. Such coprocessing may be accomplished, for example, by the high shear mixing of the two components dispersed in an aqueous medium, followed by drying to recover the coprocessed MCC. The resulting coprocessed MCC material is readily dispersible in an aqueous medium, e.g., using a high shear mixer.

A MCC coprocessed with guar that is highly preferred for use in this invention is described in U.S. Pat. No. 5,192,569 issued to McGinley and Tuason on Mar. 9, 1993. Since U.S. Pat. No. 5,192,569 discloses detailed information about the characteristics and method of manufacture of the coprocessed MCC and guar composition, this U.S. patent is hereby incorporated by reference into the present specification.

In the coprocessed MCC and guar of this invention, the guar is preferably present with the microcrystalline cellulose in the coprocessed material in a weight ratio of about 80:20 to about 90:10 MCC to guar, and more preferably, about 85:15 to about 90:10 MCC to guar.

Highly preferred stabilizer compositions of the present invention are those in which the first component, the coprocessed MCC and guar, has a MCC to guar weight ratio of about 90:10. Such coprocessed MCC and guar, with a 90:10 ratio of MCC to guar, typically exhibits a rounded or somewhat spherical appearance when viewed under magnification. Without wishing to be bound by a particular theory or mechanism, the inventors believe this physical property of the 90:10 coprocessed MCC and guar may provide behavioral or textural characteristics that mimic the lipid or fat component in a frozen dessert formulation.

For use in whipped toppings, the coprocessed MCC and guar component preferably has the MCC and guar present in a weight ratio of about 85:15.

A coprocessed MCC and guar material that is suitable for use in this invention is commercially available from FMC Corporation (Philadelphia, Pa.) under the trademark Novagel® RCN, e.g., Novagel® RCN 10 microcrystalline cellulose, which contains MCC and guar in a weight ratio of about 90:10, and Novagel® RCN 15 microcrystalline cellulose, which contains MCC and guar in a weight ratio of about 85:15.

The second component of the stabilizer composition of this invention is microcrystalline cellulose that has been coprocessed with carboxymethylcellulose. The coprocessed MCC is a particulate material that is at least partially coated or intimately admixed with the CMC, and the resulting coprocessed MCC material is a colloidal material that is readily dispersible in an aqueous medium.

A MCC coprocessed with CMC that is highly preferred for use in this invention is described in U.S. Pat. No. 3,539,365 issued to Durand, Fleck and Raynor on Nov. 10, 1970. Since U.S. Pat. No. 3,539,365 discloses detailed information about the characteristics and method of manufacture of the coprocessed MCC and CMC composition, this U.S. patent is hereby incorporated by reference into the present specification.

In the MCC coprocessed with CMC of this invention, the CMC is preferably present with the microcrystalline cellulose in the coprocessed material in a weight ratio of about 80:20 to about 90:10 MCC to CMC, and more preferably, from about 85:15 to about 90:10 MCC to CMC.

A coprocessed MCC and CMC material that is suitable for use in this invention is commercially available from FMC Corporation (Philadelphia, Pa.) under the trademark Avicel®, e.g., Avicel® RC 581 microcrystalline cellulose, which contains MCC and CMC in a weight ratio of about 89:11.

The stabilizer composition may also contain other components, such as water soluble hydrocolloids that provide complementary and/or synergistic properties or characteristics when present along with the two coprocessed MCC components. Mixtures of hydrocolloid gums are often useful for providing enhance properties not obtained from the individual gums alone. The water soluble hydrocolloid compounds may be used in the stabilizer composition, either as individual hydrocolloids or as mixtures or combinations of hydrocolloids to provide complementary properties or characteristics.

The hydrocolloid utilized in combination with the coprocessed MCC compounds may be selected from any of one or more water soluble hydrocolloids. The term "water soluble" as used herein with reference to hydrocolloids extends to hydrocolloid materials which are hydrophilic and which are water-binding, water gelling and/or water soluble. Since many of these hydrocolloids provide excellent gelling or water binding characteristics at relatively low concentrations, the term "water soluble" includes hydrocolloids which may be solubilized in water in small amounts.

Suitable hydrocolloids include hydrocolloid gums naturally derived from plants, including seaweeds, such as guar gum, locust bean gum, sodium alginate, carrageenan, potassium alginate, gum tragacanth, karaya gum, gum arabic, agar and konjac, as well as water-binding plant-derived materials such as starch, maltodextrin, inulin and the like. Other hydrocolloids such as xanthan gum, carboxymethylcellulose and other functionally-equivalent cellulose ethers like hydroxymethylcellulose, methylcellulose, and hydroxypropylmethyl-cellulose may also be used.

Particularly preferred as the hydrocolloid gum component in the stabilizer composition are one or more hydrocolloid gums selected from: xanthan, carrageenan, carboxymethylcellulose, sodium alginate, guar and mixtures or combinations thereof. Xanthan and carrageenan are two preferred hydrocolloids that may be used together in combination with the two coprocessed MCC components. A highly preferred stabilizer composition contains from about 5 to about 15 weight percent xanthan and from about 0.5 to about 5 weight percent carrageenan, based on the weight of the stabilizer composition.

The two coprocessed MCC components of the stabilizer composition are typically in the form of dried powders, which facilitates their combination with each other and with the optional hydrocolloid component of the stabilizer composition. The two coprocessed MCC components of the stabilizer may be combined by conventional methods, e.g., dry blending, with or without other optional components or ingredients (e.g., hydrocolloids or adjuvants) being present as well.

Particularly useful in the manufacture of frozen desserts or whipped toppings are stabilizer blends that contain not only the two coprocessed MCC components, optionally with a hydrocolloid or hydrocolloids, but also additional ingredients such as adjuvants. Adjuvants are additives that are commonly used or included in specific frozen dessert or whipped topping formulations, such as emulsifiers (e.g., mono- and diglycerides of fatty acids including distilled monoglycerides of fatty acids), polyoxyethylene sorbitan esters like polysorbate 80 or 65, lecithin, standardization agents (e.g., dextrose or the like for adjusting the viscosity or other properties of the stabilizer composition). Adjuvants may also include additives that improve the performance of the stabilizer in specific food product formulations, such as sequestrants to aid in dispersion of the stabilizer and other dry ingredients into the food product formulation, e.g., calcium ion sequestrants. It will be evident to one skilled in the art in view of the disclosures herein that other materials, such as sweeteners (e.g., sugar, corn syrup solids), coloring agents, flavorings and the like, could also be incorporated into the stabilizer composition, particularly for stabilizers formulated for a specific frozen dessert or whipped topping product.

The amounts of these adjuvants or other ingredients in the stabilizer composition are ordinarily not significant, but their presence in the stabilizer in large amounts, e.g., in the case of a sweetener added to the stabilizer composition, may require that adjustments be made in the concentrations of the coprocessed MCC components to compensate for the significant presence of adjuvant in the stabilizer composition.

The stabilizer composition preferably contains the first component, MCC coprocessed with guar, in an amount of from about 30 to about 90 weight and the second component, MCC coprocessed with CMC, in an amount of from about 10 to about 70 weight percent, based on the weight of the stabilizer composition. More preferably, the MCC coprocessed with guar is present in an amount of from about 50 to about 80 weight, and the MCC coprocessed with CMC is present in an amount of from about 20 to about 50 weight percent, based on the weight of the stabilizer composition.

The stabilizer of this invention preferably contains the two coprocessed MCC components in relative amounts such that the MCC coprocessed with guar is present in a greater amount by weight, relative to the MCC coprocessed with CMC.

These percentage ranges are applicable to stabilizer compositions in which the two coprocessed MCC components are present in a major amount, e.g., a total amount of at least about 70 weight percent of the stabilizer composition. For stabilizer compositions containing a large proportion of adjuvants, e.g., sweeteners or the like, or optional hydrocolloid components, the percentage ranges noted above for the two MCC coprocessed components should be adjusted downwards to account for the predominating presence of the adjuvants and/or other components in the stabilizer composition.

The amount of stabilizer incorporated into a typical frozen dessert formulation is generally in the range of about 0.5 weight percent to about 5 weight percent, based on the weight of the frozen dessert formulation. Preferably, the amount of stabilizer is about 1 weight percent to about 2.5 weight percent.

In a frozen dessert formulation or whipped topping formulation, the first component of the stabilizer system, the MCC coprocessed with guar, is preferably present in an amount of from about 0.3 weight percent to about 2 weight percent, and more preferably, from about 0.5 weight percent to about 1.5 weight percent, based on the total weight of the food product formulation.

The second component of the stabilizer system, the MCC coprocessed with CMC, is preferably present in an amount of from about 0.1 weight percent to about 1.5 weight percent, and more preferably, from about 0.2 weight percent to about 1 weight percent, based on the total weight of the food product formulation. The amount of the second component in the stabilizer system, relative to the first component, is preferably within the ratio ranges noted above.

When a frozen dessert product utilizes the stabilizer composition of this invention with the optional hydrocolloids, xanthan and carrageenan, the xanthan is preferably present in an amount of from about 0.1 to about 1 weight percent and the carrageenan is preferably present in an, amount of from about 0.01 to about 0.1 weight percent, both based on the weight of the frozen dessert.

The food products of this invention are frozen desserts, whipped toppings and other aerated food products utilizing the stabilizer composition of this invention and containing less than about 10 weight percent fat, preferably containing less than about 5 weight percent fat, including no fat food products that contain essentially no fat.

Such reduced fat frozen dessert products may include ice cream, ice milk, soft serve frozen desserts like soft serve ice cream, frozen yogurt, frozen milk shake, gelato, sherbet and mellorine. Such frozen dessert products may contain a fat source that is butterfat, milkfat, vegetable fat, vegetable oil, or other functionally equivalent fat or lipid.

The whipped toppings utilizing the stabilizer compositions of this invention are those with reduced levels of fat, below about 10 weight percent, even for high overrun formulations. Such whipped toppings include refrigerated and frozen whipped toppings and both dairy-based and nondairy-based whipped topping formulations.

One general procedure for formulating a frozen dessert with the stabilizer composition of this invention includes the steps:

1. Blend dry ingredients, which include the stabilizer composition and may include sweeteners (e.g., sugar, corn syrup solids), protein constituents (e.g., milk solids not fat) and emulsifiers.
2. Melt fat constituent with emulsifier, if emulsifier not added in step (1).
3. Add dry blend from step (1) to water and/or aqueous constituents (e.g., milk), and mix for sufficient time to ensure hydration of stabilizer components. Optionally, the stabilizer composition may first be mixed with the aqueous medium and/or water to ensure hydration and good dispersion of the stabilizer components.
4. Added melted fat constituent from step (2) to aqueous mixture from step (3), with turbulent mixing.
5. Pasteurize the mixture from the previous step via batch or HTST (high temperature short time) pasteurization, homogenize and refrigerate for sufficient time to age the homogenized mixture, e.g., overnight.
6. Blend in flavorings, if not added in prior step.
7. Freeze mixture in continuous ice cream freezer at desired overrun.

Another general procedure, useful for formulating frozen desserts that do not utilize a solid fat source, includes the steps:

1. Blend dry ingredients, including the stabilizer composition.
2. Mix aqueous constituents, including the fat source (e.g., milk, cream) and then add the dry blend from step (1) with continued mixing to ensure complete hydration of the stabilizer components.

The remaining steps (3)–(5) are the same as steps (5)–(7) noted in the previous procedure.

The procedures for preparing a whipped topping formulation are similar, except that a final step involves whipping or otherwise aerating the refrigerated product, which may then optionally be frozen as is the case with a frozen dessert.

Other procedures known to those skilled in the art of formulating and manufacturing frozen desserts, whipped toppings and other aerated food products may also be used. The point or step at which the stabilizer composition should be added will be evident to one skilled in the art, based on the disclosures in this specification.

The stabilizer composition of this invention, particularly the preferred embodiment containing xanthan and carrageenan in addition to the two coprocessed MCC components, MCC with guar and MCC with CMC, imparts the following desirable characteristics when present in very low fat or no fat frozen dessert formulations: smooth, even melting; textural properties similar to full-fat counterparts, e.g., excellent mouthfeel (smooth texture, cream like); excellent heat shock stability and prevention of large ice crystal growth under adverse freezer storage conditions.

One advantage to the use of the stabilizer composition of this invention is that reduced fat frozen dessert formulations like ice cream containing the stabilizer system may be formulated with 100 percent overrun, even for no fat formulations. Overrun is a measure of the amount of air deliberately introduced into the ice cream or other frozen dessert just prior to the time at which it is frozen. An overrun of 100 percent means that 50 percent of the frozen dessert product is air, i.e., the density of the frozen dessert has been reduced by 50 percent as compared with the density of the unaerated formulation. This ability of the stabilizer composition of this invention to duplicate the standard overrun levels employed in full-fat frozen dessert formulations results from the stabilizer acting or functioning as a foam stabilizer.

This same foam stabilization functionality makes the stabilizer composition particularly useful in reduced fat and no fat whipped toppings and other aerated food products, where structural integrity of the foam and stiffness, stand-up and peaking are desirable characteristics in such products.

The stabilizer composition of this invention provides fat-mimicking functionality for many of the desired body and textural properties of full-fat frozen dessert or full-fat whipped topping formulations.

The frozen dessert formulations of this invention, containing the stabilizer composition, do not exhibit gumminess, even for very low fat or no fat contents. This criticism is often encountered with reduced fat frozen desserts where high levels of hydrocolloid gelling agents such as xanthan are employed to bind water that is added to replace the missing fat component.

The stabilizer composition is also highly effective at preventing the growth of large ice crystals. Consequently, frozen dessert formulations containing the stabilizer composition do not exhibit an undesirable "icy" taste, even after extended storage in frost-free freezers (that subject the frozen dessert contents of the freezer to heat shock from the freezer's freeze/thaw defrosting cycles.) Another benefit provided by the stabilizer composition of this invention is decreased shrinkage of very low fat frozen desserts upon extended storage in frost-free freezers, a result of the good foam stabilization mentioned above.

The invention is illustrated further by the following nonlimiting Examples. In the Examples, all percentages are by weight unless indicated otherwise.

EXAMPLES

EXAMPLE 1

Example 1 describes two frozen dessert formulations (designated Examples 1A and 1B that contain essentially no fat and that contain the stabilizer composition of this invention. Both frozen dessert formulations contain the coprocessed MCC components of the stabilizer, as well as additional hydrocolloid components: carboxymethylcellulose, carrageenan and (for Example 1B only) guar gum.

The two coprocessed MCC components were 90 weight percent microcrystalline cellulose coprocessed with 10 weight percent guar gum and 89 weight percent microcrystalline cellulose coprocessed with 11 weight percent sodium carboxymethylcellulose. These coprocessed MCC components were present in the frozen dessert in respective amounts of 1 weight percent and 0.4 weight percent, based on the weight of the frozen dessert formulation.

The ingredients of the two frozen dessert formulations are listed in Table 1 below, which indicates the concentrations of the individual ingredients both on a weight basis and weight percent basis. Note that the flavor component, which is introduced after the frozen dessert formulation is homogenized, is not included in the formulation data shown in Table 1. Viscosities of the formulation mixtures (prior to freezing) and the overrun of the frozen dessert formulations are also indicated at the bottom of Table 1.

The frozen dessert formulations were prepared by the following procedure, which is specific to Example 1B. For Example 1A, the procedure was identical except that guar was not added and the amounts of skim milk and milk solids non fat were slightly different, as noted in Table 1.

A dry blend was prepared containing 50 grams (g) (1.0%) milk solids non fat, 590 g (11.8%) sugar, 270.5 g (5.4%) corn syrup solids, 12.5 g (0.25%) Tandem® 100k emulsifier, which is an 80:20 mixture of mono,diglycerides:polysorbate 80 (Witco Corporation, Greenwich, Conn.) and the stabilizer composition: 50 g (1.0%) coprocessed MCC and guar in a 90:10 weight ratio, 20 g (0.4%) coprocessed MCC and CMC in an 89:11 weight ratio, 5 g (0.1%) Aqualon® 7HF carboxymethylcellulose (Hercules Incorporated, Wilmington, Del.), 2 g (0.04%) SeaKem® IC 614 carrageenan (FMC Corporation, Philadelphia, Pa.) and 5 g (0.1%) guar gum.

In a container stirred with a Lightnin® mixer (Lightnin, Rochester, N.Y.) was placed 3995 g (79.9%) skim milk. The dry blend was then added to the vortex of the skim milk liquid in the stirred container and was mixed for 30 minutes to fully hydrate the hydrocolloid gums in the mixture.

The mixture was then pasteurized in a batch process at 78.3° C. (173° F.) for 25 seconds. After pasteurization, the mixture was homogenized using an APV Gaulin Homogenizer, the first stage being operated at 2000 psi and the second stage at 500 psi. Upon completion of homogenization, the mixture was cooled and aged overnight in a refrigerator at 1.7°–4.4° C. (35°–40° F.).

After the overnight aging, 1.5 g vanilla flavor was added to the homogenized mixture, with gentle stirring with a wooden spoon to prevent incorporation of air into the mixture. The mixture was then processed by freezing in an Armfield FT-25A continuous freezer with an overrun of 95 percent.

Prior to being frozen, the viscosity of the homogenized flavored mixture was first determined for a 400 mL (milliliter) sample using a Brookfield RVT viscometer with spindle #3 operated at 20 rpm and at a temperature of 4.4° C. (40° F.). A second viscosity measurement was made using a #3 Zahn cup.

Results of these procedures for the two frozen dessert formulations, Example 1A and Example 1B, are shown in Table 1:

TABLE 1

| Ingredients | Formulation | | | |
|---|---|---|---|---|
| | Example 1A Weight | | Example 1B Weight | |
| | (grams) | (%) | (grams) | (%) |
| Skim milk | 3992.5 | 79.8 | 3995 | 79.9 |
| Milk solids non fat | 57.5 | 1.2 | 50 | 1.0 |
| Sugar | 590 | 11.8 | 590 | 11.8 |
| Corn syrup solids | 270.5 | 5.4 | 270.5 | 5.4 |
| Coprocessed MCC: | | | | |
| MCC: Guar (90:10 wt ratio) | 50 | 1.0 | 50 | 1.0 |
| MCC: CMC (89:11 wt ratio) | 20 | 0.4 | 20 | 0.4 |
| Hydrocolloids: | | | | |
| Carboxymethylcellulose | 5 | 0.1 | 5 | 0.1 |
| Carrageenan | 2 | 0.04 | 2 | 0.04 |
| Guar gum | | | 5 | 0.1 |
| Emulsifier | 12.5 | 0.25 | 12.5 | 0.25 |
| Totals: | 5000 | ~100 | 5000 | ~100 |

TABLE 1-continued

| Ingredients | Formulation | | | |
|---|---|---|---|---|
| | Example 1A Weight | | Example 1B Weight | |
| | (grams) | (%) | (grams) | (%) |
| Brookfield viscosity (cps) | 700 | | 925 | |
| Zahn cup #3 viscosity (sec) | 13 | | 13 | |
| Overrun (%) | 90–100 | | 90–100 | |

The no fat frozen dessert of Example 1A was compared with a commercially available low fat (6.6%) frozen dessert, and both had similar texture and body. The no fat frozen dessert of Example 1B was compared to a commercially available full-fat (11.7%) frozen dessert, and both had very similar body and texture.

The no fat frozen desserts of Examples 1A and 1B were stored in a frost free freezer for a five day period, during which time they were subjected to temperature cycling in the freezer at a rate of 4 freeze/thaw cycles per day. Neither of the two frozen desserts exhibited any significant level of ice crystal formation during this five day storage period.

EXAMPLE 2

Example 2 describes two frozen dessert formulations (designated Examples 2A and 2B) that contain essentially no fat and that contain the stabilizer composition of this invention. Both frozen dessert formulations contain the coprocessed MCC components of the stabilizer, as well as additional hydrocolloid components (different from those utilized in the previous example): xanthan gum (at two different concentrations) and carrageenan.

The two coprocessed MCC components were again 90 weight percent microcrystalline cellulose coprocessed with 10 weight percent guar gum and 89 weight percent microcrystalline cellulose coprocessed with 11 weight percent sodium carboxymethylcellulose. These coprocessed MCC components were again present in the frozen dessert in respective amounts of 1 weight percent and 0.4 weight percent, based on the weight of the frozen dessert formulation.

The ingredients of the two frozen dessert formulations are listed in Table 2 below, which indicates the concentrations of the individual ingredients both on a weight basis and weight percent basis. Note that the flavor component, which is introduced after the frozen dessert formulation is homogenized, is not included in the formulation data shown in Table 2. Viscosities of the formulation mixtures (prior to freezing) of the frozen dessert formulations are also indicated at the bottom of Table 2.

The frozen dessert formulations were prepared by the following procedure, which is specific to Example 2B and is similar to that followed in the previous example. For Example 2A, the procedure was identical to that for Example 2B except that the amount of xanthan gum was 7.5 g (0.15%) instead of 12.5 g (0.25%) and the amounts of corn syrup solids were slightly different, as noted in Table 2.

A dry blend was prepared containing 325 g (6.5%) milk solids non fat, 650 g (13.0%) sugar, 287.5 g (5.75%) corn syrup solids, 10 g (0.2%) Tandem® 100k emulsifier, which is an 80:20 mixture of mono,diglycerides:polysorbate 80 (Witco Corporation) and the stabilizer composition: 50 g (1.0%) coprocessed MCC and guar in a 90:10 weight ratio, 20 g (0.4%) coprocessed MCC and CMC in an 89:11 weight ratio, 12.5 g (0.25%) Keltrol® RD xanthan gum (Kelco Division of Monsanto Company, St. Louis, Mo.) and 0.5 g (0.01%) SeaKem® IC 614 carrageenan (FMC Corporation).

In a container stirred with a Lightnin® mixer was placed 3644.5 g (72.9%) skim milk. The dry blend was added to the vortex of the skim milk liquid in the stirred container and was mixed for 30 minutes to fully hydrate the hydrocolloid gums in the mixture.

The mixture was then pasteurized in a batch process at 78.3° C. (173° F.) for 25 seconds. After pasteurization, the mixture was homogenized using an APV Gaulin Homogenizer, the first stage being operated at 2000 psi and the second stage at 500 psi. Upon completion of homogenization, the mixture was cooled and aged overnight in a refrigerator at 1.7°–4.4° C. (35°–40° F.).

After the overnight aging, 25 g vanilla flavor was added to the homogenized mixture, with gentle stirring with a wooden spoon to prevent incorporation of air into the mixture. The mixture was then processed by freezing in an Armfield FT-25A continuous freezer. The amount of overrun was not measured in this Example.

Prior to being frozen, the viscosity of the homogenized flavored mixture was first determined for a 400 mL sample using a Brookfield RVT viscometer with spindle #3 operated at 20 rpm and at a temperature of 4.4° C. (40° F.). A second viscosity measurement was made using a #3 Zahn cup.

Results of these procedures for the two frozen dessert formulations, Example 2A and Example 2B, are shown in Table 2:

TABLE 2

| | Formulation | | | |
|---|---|---|---|---|
| | Example 2A | | Example 2B | |
| | Weight | | Weight | |
| Ingredients | (grams) | (%) | (grams) | (%) |
| Skim milk | 3644.5 | 72.9 | 3944.5 | 72.9 |
| Milk solids non fat | 325 | 6.5 | 325 | 6.5 |
| Sugar | 650 | 13.0 | 650 | 13.0 |
| Corn syrup solids | 292.5 | 5.85 | 287.5 | 5.75 |
| Coprocessed MCC: | | | | |
| MCC: Guar (90:10 wt ratio) | 50 | 1.0 | 50 | 1.0 |
| MCC: CMC (89:11 wt ratio) | 20 | 0.4 | 20 | 0.4 |
| Hydrocolloids: | | | | |
| Xanthan gum | 7.5 | 0.15 | 12.5 | 0.25 |
| Carrageenan | 0.5 | 0.01 | 0.5 | 0.01 |
| Emulsifier | 10 | 0.2 | 10 | 0.2 |
| Totals: | 5000 | ~100 | 5000 | ~100 |
| Brookfield viscosity (cps) | 375 | | 900 | |
| Zahn cup #3 viscosity (sec) | 12 | | 16 | |

The no fat frozen desserts of Example 2A and Example 2B were satisfactory overall and demonstrate the efficient use of the stabilizer compositions of this invention. The no fat frozen dessert formulation of Example 2A, with a lower xanthan concentration than in Example 2B, exhibited a lower viscosity which provided better processing efficiencies than that for Example 2B. A slight separation of whey was noticed after the overnight aging following freezing of the frozen dessert in Example 2A, but this could be overcome by increasing the level of carrageeenan in the frozen dessert formulation from 0.01 weight percent to 0.02 weight percent. The no fat frozen dessert of Example 2B, using a higher xanthan concentration than in Example 2A, exhibited very even, smooth melting properties, a desirable attribute that resulted in a well-rounded ball of unmelted frozen dessert during melting, in comparison to the frozen dessert of Example 2A which exhibited somewhat even melting properties.

EXAMPLE 3

Example 3 describes two frozen dessert formulations (designated Examples 3A and 3B) that contain essentially no fat and that contain the stabilizer composition of this invention. Both frozen dessert formulations contain the coprocessed MCC components of the stabilizer, as well as additional hydrocolloid components (different from those utilized in the previous examples): maltodextrin and carrageenan (in Example 3A) and starch and carrageenan (in Example 3B).

The two coprocessed MCC components were again 90 weight percent microcrystalline cellulose coprocessed with 10 weight percent guar gum and 89 weight percent microcrystalline cellulose coprocessed with 11 weight percent sodium carboxymethylcellulose. These coprocessed MCC components were again present in the frozen dessert in respective amounts of 1 weight percent and 0.4 weight percent, based on the weight of the frozen dessert formulation.

The ingredients of the two frozen dessert formulations are listed in Table 3 below, which indicates the concentrations of the individual ingredients both on a weight basis and weight percent basis. Viscosities of the formulation mixtures (prior to freezing) of the frozen dessert formulations are also indicated at the bottom of Table 3.

The frozen dessert formulations were prepared by the following procedure, which is specific to Example 3A and is similar to that followed in the previous examples. For Example 3B, the procedure was identical to that for Example 3A except that starch was present instead of maltodextrin and the amounts of skim milk, milk solids non fat and corn syrup solids were slightly different, as noted in Table 3.

A dry blend was prepared containing 50 g (1.0%) milk solids non fat, 590 g (11.8%) sugar, 250.5 g (5.0%) corn syrup solids, 12.5 g (0.25%) Tandem® 100k emulsifier, which is an 80:20 mixture of mono,diglycerides:polysorbate 80 (Witco Corporation) and the stabilizer composition: 50 g (1.0%) coprocessed MCC and guar in a 90:10 weight ratio, 20 g (0.4%) coprocessed MCC and CMC in an 89:11 weight ratio, 5 g (0.1%) Aqualon® 7HF carboxymethylcellulose (Hercules Incorporated), 25 g (0.5%) maltodextrin and 2 g (0.04%) SeaKem® IC 614 carrageenan (FMC Corporation).

In a container stirred with a Lightnin® mixer was placed 3995 g (79.9%) skim milk. The dry blend was added to the vortex of the skim milk liquid in the stirred container and was mixed for 30 minutes to fully hydrate the hydrocolloid gums in the mixture.

The mixture was then pasteurized in a batch process at 78.3° C. (173° F.) for 25 seconds. After pasteurization, the mixture was homogenized using an APV Gaulin Homogenizer, the first stage being operated at 2000 psi and the second stage at 500 psi. Upon completion of homogenization, the mixture was cooled and aged overnight in a refrigerator at 1.7°–4.4° C. (35°–40° F.). Unlike the previous examples, no flavor was added after the overnight aging.

After the overnight aging, the mixture was processed by freezing in an Armfield FT-25A continuous freezer. The amount of overrun was not measured in this Example.

Prior to being frozen, the viscosity of the homogenized flavored mixture was first determined for a 400 mL sample using a Brookfield RVT viscometer with spindle #3 operated at 20 rpm and at a temperature of 4.4° C. (40° F.). A second viscosity measurement was made using a #3 Zahn cup.

Results of these procedures for the two frozen dessert formulations, Example 3A and Example 3B, are shown in Table 3:

TABLE 3

| | Formulation | | | |
|---|---|---|---|---|
| | Example 3A Weight | | Example 3B Weight | |
| Ingredients | (grams) | (%) | (grams) | (%) |
| Skim milk | 3995 | 79.9 | 3992.5 | 79.8 |
| Milk solids non fat | 50 | 1.0 | 53 | 1.1 |
| Sugar | 590 | 11.8 | 590 | 11.8 |
| Corn syrup solids | 250.5 | 5.0 | 250 | 5.0 |
| Coprocessed MCC: | | | | |
| MCC: Guar (90:10 wt ratio) | 50 | 1.0 | 50 | 1.0 |
| MCC: CMC (89:11 wt ratio) | 20 | 0.4 | 20 | 0.4 |
| Hydrocolloids: | | | | |
| Carboxymethylcellulose | 5 | 0.1 | 5 | 0.1 |
| Maltodextrin | 25 | 0.5 | | |
| Starch | | | 25 | 0.5 |
| Carrageenan | 2 | 0.04 | 2 | 0.04 |
| Emulsifier | 12.5 | 0.25 | 12.5 | 0.25 |
| Totals: | 5000 | ~100 | 5000 | ~100 |
| Brookfield viscosity (cps) | 140 | | 240 | |
| Zahn cup #3 viscosity (sec) | 14 | | 18 | |

The no fat frozen desserts of Example 3A and Example 3B were satisfactory overall and demonstrate the efficient use of the stabilizer compositions of this invention. The no fat frozen dessert formulation of Example 3A was very slightly wet as it was extruded from the barrel of the continuous freezer, and the no fat frozen dessert formulation of Example 3B was more wet as it was extruded, under the operating conditions used for the continuous freezer. Both frozen dessert products had a wet appearance when melting. No taste testing evaluation was carried out since no flavor had been added to either of these frozen dessert formulations during their preparation.

EXAMPLE 4

Example 4 describes two frozen dessert formulations (designated Examples 4A and 4B) that contain essentially no fat and that contain the stabilizer composition of this invention. Both frozen dessert formulations contain the coprocessed MCC components of the stabilizer, as well as additional hydrocolloid components: carboxymethylcellulose and carrageenan. This Example may be differentiated from Example 1 by its use of frozen dessert formulations that contained high levels of milk solids, in excess of 14 percent (note that a portion of the milk solids is present in the skim milk used in the formulations).

The two coprocessed MCC components were, as in the previous examples, 90 weight percent microcrystalline cellulose coprocessed with 10 weight percent guar gum and 89 weight percent microcrystalline cellulose coprocessed with 11 weight percent sodium carboxymethylcellulose. These coprocessed MCC components were again present in the frozen dessert in respective amounts of 1 weight percent and 0.4 weight percent, based on the weight of the frozen dessert formulation.

The ingredients of the two frozen dessert formulations are listed in Table 4 below, which indicates the concentrations of the individual ingredients both on a weight basis and weight percent basis. Note that the flavor component, which is introduced after the frozen dessert formulation is homogenized, is not included in the formulation data shown in Table 4. Viscosities of the formulation mixtures (prior to freezing) and the overrun of the frozen dessert formulations are also indicated at the bottom of Table 4.

The frozen dessert formulations were prepared by the following procedure, which is specific to Example 4B. For Example 4A, the procedure was identical except that calcium sulfate was not added and the amount of sugar was slightly higher, as noted in Table 4. The calcium sulfate was added in Example 4B since reports in the literature indicated that it binds with carrageenan and could promote dry extrusion properties in the extruded product, but no difference was noted between Example 4A and 4B in this respect.

A dry blend was prepared containing 550 g (11.0%) milk solids non fat, 575 g (11.5%) sugar, 250 g (5.0%) corn syrup solids, 10 g (0.2%) Tandem® 100k emulsifier, which is an 80:20 mixture of mono,diglycerides:polysorbate 80 (Witco Corporation), 6 g (0.12%) calcium sulfate and the stabilizer composition: 50 g (1.0%) coprocessed MCC and guar in a 90:10 weight ratio, 20 g (0.4%) coprocessed MCC and CMC in an 89:11 weight ratio, 5 g (0.1%) Aqualon® 7HF carboxymethylcellulose (Hercules Incorporated) and 1.5 g (0.03%) SeaKem® IC 611 carrageenan (FMC Corporation).

In a container stirred with a Lightnin® mixer (Lightnin, Rochester, N.Y.) was placed 3532.5 g (70.6%) skim milk. The dry blend was then added to the vortex of the skim milk liquid in the stirred container and was mixed for 30 minutes to fully hydrate the hydrocolloid gums in the mixture.

The mixture was then pasteurized in a batch process at 78.3° C. (173° F.) for 25 seconds. After pasteurization, the mixture was homogenized using an APV Gaulin Homogenizer, the first stage being operated at 2000 psi and the second stage at 500 psi. Upon completion of homogenization, the mixture was cooled and aged overnight in a refrigerator at 1.7°–4.4° C. (35°–40° F.).

After the overnight aging, 22.5 g vanilla flavor was added to the homogenized mixture, with gentle stirring with a wooden spoon to prevent incorporation of air into the mixture. The mixture was then processed by freezing in an Armfield FT-25A continuous freezer. The amount of overrun was not measured in this Example.

Prior to being frozen, the viscosity of the homogenized flavored mixture was first determined for a 400 mL sample using a Brookfield RVT viscometer with spindle #3 operated at 20 rpm and at a temperature of 4.4° C. (40° F.). A second viscosity measurement was made using a #3 Zahn cup.

Results of these procedures for the two frozen dessert formulations, Example 4A and Example 4B, are shown in Table 4:

TABLE 4

| | Formulation | | | |
|---|---|---|---|---|
| | Example 4A Weight | | Example 4B Weight | |
| Ingredients | (grams) | (%) | (grams) | (%) |
| Skim milk | 3532.5 | 70.6 | 3532.5 | 70.6 |
| Milk solids non fat | 550 | 11.0 | 550 | 11.0 |
| Sugar | 581 | 11.6 | 575 | 11.5 |
| Corn syrup solids | 250 | 5.0 | 250 | 5.0 |

TABLE 4-continued

| | Formulation | | | |
|---|---|---|---|---|
| | Example 4A Weight | | Example 4B Weight | |
| Ingredients | (grams) | (%) | (grams) | (%) |
| Coprocessed MCC: | | | | |
| MCC: Guar (90:10 wt ratio) | 50 | 1.0 | 50 | 1.0 |
| MCC: CMC (89:11 wt ratio) | 20 | 0.4 | 20 | 0.4 |
| Hydrocolloids: | | | | |
| Carboxymethylcellulose | 5 | 0.1 | 5 | 0.1 |
| Carrageenan | 1.5 | 0.03 | 1.5 | 0.03 |
| Calcium sulfate | | | 6 | 0.12 |
| Emulsifier | 10 | 0.2 | 10 | 0.2 |
| Totals: | 5000 | ~100 | 5000 | ~100 |
| Brookfield viscosity (cps) | 225 | | 275 | |
| Zahn cup #3 viscosity (sec) | 12.5 | | 14 | |

The no fat frozen desserts of Example 4A and Example 4B were both satisfactory. The no fat frozen dessert formulations of Examples 4A and 4B were judged to be of excellent quality as they were extruded from the barrel of the continuous freezer, and both processed in a satisfactory manner, i.e., both presented a dry, stiff appearance during extrusion without fluctuation in the overrun. Sensory evaluation of the frozen dessert products was initially very good, with the products exhibiting good flavor and mouthcoating characteristics. Both frozen dessert products exhibited uneven melting characteristics, which was likely attributable to protein binding from the carrageenan; this could be overcome by use of lower levels or a different type of carrageenan in the formulations.

As a result of lactose crystallization that occurred within 6 days (24 freeze-thaw cycles) due to the high concentration of milk solids in the formulations, the sensory quality of these frozen dessert products deteriorated rapidly. Acceptable frozen dessert product quality, it is believed, would result if the level of milk solids in the formulation were reduced below 14 percent, to reduce the likelihood of lactose crystallization.

EXAMPLE 5

Example 5 describes a whipped topping formulation that contains about 7 weight percent fat and that contains the stabilizer composition of this invention. The whipped topping formulation contains the coprocessed MCC components of the stabilizer, as well as an additional hydrocolloid component: carboxymethylcellulose.

The two coprocessed MCC components were 85 weight percent microcrystalline cellulose coprocessed with 15 weight percent guar gum (in contrast to the 90:10 coprocessed MCC to guar weight ratio used in the previous examples) and 89 weight percent microcrystalline cellulose coprocessed with 11 weight percent sodium carboxymethylcellulose. These coprocessed MCC components were utilized in the whipped topping in amounts of 0.5 weight percent for the MCC:guar and 0.6 weight percent for the MCC:CMC, based on the weight of the whipped topping formulation.

The ingredients of the whipped topping formulation are listed in Table 5 below, which indicates the concentrations of the individual ingredients both on a weight basis and weight percent basis.

The whipped topping formulation was prepared by the following procedure.

In a container stirred with a Lightning mixer (Lightnin, Rochester, N.Y.) at a high speed, the coprocessed MCC components of the stabilizer composition, 3.0 g (0.5%) coprocessed MCC and guar in a 85:15 weight ratio, and 3.6 g (0.6%) coprocessed MCC and CMC in an 89:11 weight ratio, were dispersed into 256.8 g (42.80%) deionized water over a ten minute mixing period. Next, 0.3 g (0.05%) Aqualon® 7HF carboxymethylcellulose (Hercules Incorporated) was gradually added to the vortex of liquid in the stirred container and mixed for ten minutes.

A dry blend of 90 g (15%) sucrose and 84 g (14%) milk solids non fat was then added to the aqueous mixture, and mixing was continued for five more minutes. Next 42 g (7%) corn syrup solids, 42 DE, was added with mixing for one minute. Finally, 116.4 g (19.4%) heavy whipping cream (36 weight percent fat) was added with mixing for an additional minute. This mixture was then heated to a temperature of 71° C. (160° F.).

In a separate container, an emulsifier blend was prepared by adding 2.1 g (0.35%) Tween® polysorbate 60 (ICI America Inc., Wilmington, Del.) and 1.8 g (0.3%) Myverol® 18-06 distilled monoglycerides (Eastman Chemical Co., Kingsport, Tenn.) and melting them together in the container at a temperature of 71° C. (160° F.). The blended emulsifiers were then added to the first mixture.

The mixture was then pasteurized in a batch process at 71° C. (160° F.) for 30 minutes. After pasteurization, the mixture was homogenized using an APV Gaulin Homogenizer, the first stage being operated at 600–800 psi and the second stage at 200 psi. Upon completion of homogenization, the mixture was cooled and aged for 24 hours in a refrigerator at 1.7°–4.4° C. (35–40° F.).

After the aging period, the homogenized, aged mixture was whipped for 1.5–3 minutes in a Hobart mixer with a whisk attachment at high speed. The whipped mixture had an overrun of 133 percent.

The whipped topping appeared satisfactory in all respects and was stored in a refrigerator. Characteristics of a good quality whipped topping include good foam stiffness and rigidity, e.g., the ability of the whipped topping to make peaks, at relatively high overrun levels and a good mouthfeel. After three days of refrigerated storage, the whipped topping collapsed. Longer storage stability is normally desired, and this could be obtained by increasing the level of stabilizer, as well as by the use of optimized homogenization and whipping processing conditions.

TABLE 5

| | Formulation Example 5 Weight | |
|---|---|---|
| Ingredients | (grams) | (%) |
| Heavy whipping cream (36% fat) | 116.4 | 19.4 |
| Milk solids non fat | 84 | 14 |
| Sucrose | 90 | 15 |
| Corn syrup solids | 42 | 7.0 |
| Coprocessed MCC: | | |
| MCC: Guar (85:15 wt ratio) | 3.0 | 0.5 |
| MCC: CMC (89:11 wt ratio) | 3.6 | 0.6 |
| Hydrocolloid: | | |
| Carboxymethylcellulose | 0.3 | 0.05 |

TABLE 5-continued

| Ingredients | Formulation Example 5 Weight | |
|---|---|---|
| | (grams) | (%) |
| Emulsifiers | | |
| Polysorbate 60 | 2.1 | 0.35 |
| Distilled monoglycerides | 1.8 | 0.30 |
| Water | 256.8 | 42.8 |
| Totals: | 600 | ~100 |

What is claimed is:

1. A stabilizer composition, useful for stabilizing food product formulations comprising
   (a) microcrystalline cellulose (MCC) coprocessed with guar having a weight ratio of MCC to guar of from about 90:10 to about 80:20;
   (b) MCC coprocessed with carboxymethylcellulose (CMC) having a weight ratio of MCC to CMC of from about 90:10 to about 80:20; and
   (c) one or more water soluble hydrocolloid(s), wherein the MCC coprocessed with guar is present in an amount of from about 50 to about 80 weight percent and the MCC coprocessed with CMC is present in an amount of from about 20 to about 50 weight percent, based on the weight of the stabilizer composition.

2. The stabilizer composition of claim 1 wherein the hydrocolloid(s) is(are) selected from the group consisting of xanthan gum, carrageenan, carboxymethylcellulose, guar gum, locust bean gum, sodium alginate, gum tracanth, karaya gum, gum arabic, agar, konjac, starch, maltodextrin, methylcellulose, hydroxymethylcellulose, hydroxymethylcellulose and mixtures thereof.

3. The stabilizer composition of claim 2 wherein the hydrocolloid(s) is(are) xanthan gum, carrageenan or a mixture thereof.

4. The stabilizer composition of claim 3 wherein the xanthan gum is present in an amount of from about 5 to about 15 weight percent and the carrageenan is present in an amount of from about 0.5 to about 5 weight percent, based on the weight of the stabilizer composition.

5. The stabilizer composition of claim 1 which further comprises at least one adjuvant selected from the group consisting of emulsifier, stabilizing agent, sweetener, coloring agent, flavoring and sequestrant.

6. A frozen dessert product containing the stabilizer composition of claim 1.

7. A whipped topping product containing the stabilizer composition of claim 1.

8. A food product comprising a frozen dessert having less than about 10 weight percent fat or whipped topping having less than about 10 weight percent fat and containing a stabilizer system that contains (a) microcrystalline cellulose (MCC) coprocessed with guar and (b) microcrystalline cellulose coprocessed with carboxymethylcellulose (CMC).

9. The food product of claim 8 wherein the stabilizer system is present in the food product in an amount of from about 0.5 to about 5 weight percent, based on the weight of the food product.

10. The food product of claim 8 wherein the stabilizer system is present in the food product in an amount of from about 1 to about 2.5 weight percent, based on the weight of the food product.

11. The food product of claim 8 wherein, in the stabilizer system, the MCC coprocessed with guar is present in a larger amount, as compared to the MCC coprocessed with CMC.

12. The food product of claim 11 wherein the MCC coprocessed with guar in the stabilizer system is present in the food product in an amount of from about 0.3 to about 2 weight percent, based on the weight of the food product.

13. The food product of claim 11 wherein the MCC coprocessed with CMC in the stabilizer system is present in the frozen dessert in an amount of from about 0.1 to about 1.5 weight percent, based on the weight of the food product.

14. The food product of claim 8 wherein, in the stabilizer system, the MCC coprocessed with guar contains a weight ratio of MCC to guar of from about 90:10 to about 80:20.

15. The food product of claim 8 wherein, in the stabilizer system, the MCC coprocessed with CMC contains a weight ratio of MCC to CMC of from about 90:10 to about 80:20.

16. The food product of claim 8 wherein, in the stabilizer system, the MCC coprocessed with guar contains a weight ratio of about 90:10 MCC to guar and the MCC coprocessed with CMC contains a weight ratio of about 89:11 MCC to CMC.

17. The food product of claim 8 wherein the stabilizer system further comprises at least one water soluble hydrocolloid.

18. The food product of claim 17 wherein the hydrocolloid is selected from the group consisting of xanthan gum, carrageenan, carboxymethylcellulose, guar gum, locust bean gum, sodium alginate, gum tragacanth, karaya gum, gum arabic, agar, konjac, starch, maltodextrin, methylcellulose, hydroxymethylcellulose, hydroxypropylmethylcellulose and mixtures thereof.

19. The food product of claim 8 wherein the food product is a frozen dessert and wherein the stabilizer further comprises xanthan gum and carrageenan.

20. The food product of claim 19 wherein the xanthan gum is present in an amount of from about 0.1 to about 1 weight percent and the carrageenan is present in an amount of from about 0.01 to about 0.1 weight percent, based on the weight of the food product.

21. The food product of claim 8 wherein the stabilizer system further comprises at least one adjuvant selected from the group consisting of emulsifier, stabilizing agent, sweetener, coloring agent, flavoring and sequestrant.

22. The food product of claim 8 wherein the food product contains less than about 5 weight percent fat, based on the weight of the food product.

23. The food product of claim 8 wherein the food product contains essentially no fat.

24. The food product of claim 8 wherein the food product is a frozen dessert that is selected from the group consisting of ice cream, ice milk, soft serve ice cream, frozen yogurt, frozen milk shake, sherbet, gelato and mellorine.

25. A method of stabilizing a reduced fat food product which comprises incorporating into a food product that is a frozen dessert having less than about 10 weight percent fat or a whipped topping having less than about 10 weight percent fat a stabilizer system that contains (a) microcrystalline cellulose (MCC) coprocessed with guar and (b) microcrystalline cellulose coprocessed with carboxymethylcellulose (CMC), said stabilizer system being incorporated into the frozen dessert in an amount of from about 0.5 to about 5 weight percent, based on the weight of the food product.

26. The method of claim 25 wherein the stabilizer system is incorporated into the food product in an amount of from about 1 to about 2.5 weight percent, based on the weight of the food product.

27. The method of claim 25 wherein the MCC coprocessed with guar in the stabilizer system is incorporated into the food product in an amount of from about 0.3 to about 2 weight percent, based on the weight of the food product.

28. The method of claim 25 wherein the MCC coprocessed with CMC in the stabilizer system is incorporated into the food product in an amount of from about 0.1 to about 1.5 weight percent, based on the weight of the food product.

29. The method of claim 25 wherein, in the stabilizer system, the MCC coprocessed with guar contains a weight ratio of MCC to guar of from about 90:10 to about 80:20.

30. The method of claim 25 wherein, in the stabilizer system, the MCC coprocessed with CMC contains a weight ratio of MCC to CMC of from about 90:10 to about 80:20.

31. The method of claim 25 wherein, in the stabilizer system, the MCC coprocessed with guar contains a weight ratio of about 90:10 MCC to guar and the MCC coprocessed with CMC contains a weight ratio of about 89:11 MCC to CMC.

32. The method of claim 25 wherein the stabilizer system further comprises at least one water soluble hydrocolloid.

33. The method of claim 32 wherein the hydrocolloid is selected from the group consisting of xanthan gum, carrageenan, carboxymethylcellulose, guar gum, locust bean gum, sodium alginate, gum tragacanth, karaya gum, gum arabic, agar, konjac, starch, maltodextrin, methylcellulose, hydroxymethylcellulose, hydroxypropylmethylcellulose and mixtures thereof.

34. The method of claim 25 wherein the food product is a frozen dessert and the stabilizer system further comprises xanthan gum and carrageenan.

35. The method of claim 34 wherein the xanthan gum is present in an amount of from about 0.1 to about 1 weight percent and the carrageenan is present in an amount of from about 0.01 to about 0.1 weight percent, based on the weight of the frozen dessert.

36. The method of claim 25 wherein the stabilizer system further comprises at least one adjuvant selected from the group consisting of emulsifier, stabilizing agent, sweetener, coloring agent, flavoring and sequestrant.

37. The method of claim 25 wherein the food product contains less than about 5 weight percent fat, based on the weight of the food product.

38. The method of claim 25 wherein the food product contains essentially no fat.

39. The method of claim 25 wherein the food product is a frozen dessert that is selected from the group consisting of ice cream, ice milk, soft serve ice cream, frozen yogurt, frozen milk shake, sherbet, gelato and mellorine.

40. The method of claim 25 wherein the food product is a whipped topping that is selected from the group consisting of frozen whipped topping, refrigerated whipped topping, dairy-based whipped topping and nondairy-based whipped topping.

* * * * *